United States Patent [19]
Gu et al.

[11] Patent Number: 6,094,028
[45] Date of Patent: Jul. 25, 2000

[54] BATTERY CHARGING AND HANDLING SYSTEM FOR ELECTRIC VEHICLES

[75] Inventors: Huan-Lung Gu, HuaLien; Tseng-Teh Wei; Li-Ru Cheng, both of Hsinchu, all of Taiwan

[73] Assignee: Industrial Technology Research Institute, Taiwan

[21] Appl. No.: 09/346,577

[22] Filed: Jul. 1, 1999

[30] Foreign Application Priority Data

Jan. 28, 1999 [TW] Taiwan ................................. 88201378

[51] Int. Cl.⁷ ............................. H01M 10/46; B65G 1/00
[52] U.S. Cl. ............................. 320/109; 104/34; 414/282
[58] Field of Search .................................. 320/104, 109, 320/FOR 101, DIG. 34, DIG. 35; 104/34; 414/281, 282, 285, 286

[56] References Cited

U.S. PATENT DOCUMENTS

| | | |
|---|---|---|
| 3,836,020 | 9/1974 | Lassig . |
| 4,227,463 | 10/1980 | Pfleger ................................. 104/34 |
| 4,450,400 | 5/1984 | Gwyn .................................. 104/34 X |
| 5,187,423 | 2/1993 | Marton ................................. 104/34 X |
| 5,508,597 | 4/1996 | Parmley, Sr. ........................ 104/34 X |
| 5,612,606 | 3/1997 | Guimarin et al. .................... 104/34 X |
| 5,711,648 | 1/1998 | Hammerslag . |

*Primary Examiner*—Edward H. Tso

[57] ABSTRACT

A selective-type battery charging and transferring system for electric vehicle uses a discretionary scheme rather than conventional continuous scheme and select the fully-charged battery to load on the transfer stage. The electric vehicle can be ensured to load with the most fully charged battery, thus eliminates the difficulty caused by the charging time difference.

14 Claims, 8 Drawing Sheets

BATTERY CHARGING AND HANDLING SYSTEM FOR ELECTRIC VEHICLES

FIELD OF THE INVENTION

The present invention relates to a selective-type battery charging and transferring system for electric vehicle. The inventive system employs discretionary scheme rather than conventional continuous scheme and selects the fully-charged battery to load on the transfer stage, thus eliminates the difficulty caused by the charging time difference.

BACKGROUND OF THE INVENTION

Due to the pollution problem of the petrochemical based system such as pant or vehicle using petroleum, the system powered by electrical energy is become more attractive.

However, the present battery for electric vehicle is generally bulky and hard to be carried manually, and the charging of such battery requires long time. Therefore, battery charging and transferring system for electric vehicle is extensively studied.

However, in nowadays battery charging and transferring system, the transfer is continuous, i.e., the fully charged battery is sent from convey belt to transfer stage, the non-fully charged battery is sent from transfer stage to the convey belt. The non-fully charged battery is sent through the sensor, the non-fully battery is sent to the storage chamber for charging, the fully charged battery is sent from the storage chamber to the convey belt.

As shown in FIG. 1, in this continuous scheme, the battery to be loaded on the vehicle may not be fully charged because the condition of those batteries may be different.

FIG. 2 shows the perspective view of U.S. Pat. No. 5,711,648, this system still has the problem of different initial battery charging condition, the fully-charged battery may be blocked by those batteries requiring long charging time. Therefore, this system has defective efficiency.

Moreover, in the conventional battery charging and transferring system, the batteries are demanded to cover all convey space. Therefore, large number of stand-by batteries are required and the arrangement of battery is less flexible. This problem is worsen for smaller work space such as trailer.

Moreover, the conventional continuous battery charging and transferring system, the battery detection operation should be finished before the charging operation. It is difficult to pick up the defective battery during the charging operation.

SUMMERY OF THE INVENTION

It is an object of the present invention to provide a battery charging and transferring system wherein the charging of the battery can be more efficiently managed and the most fully charged battery is loaded on the electric vehicle.

The present invention is intended to use a discretionary scheme rather than conventional continuous scheme and select the fully-charged battery to load on the transfer stage, thus eliminates the difficulty caused by the charging time difference.

To achieve the above object, the inventive system comprises a transfer stage for clamping the electric vehicle requiring a fully-charged battery and replacing a fully-charged battery for the vehicle; a buffer stage beside the transfer stage, wherein the used battery unloaded from the electric vehicle is arranged in one side thereof and a fully-charged battery is arranged on another side thereof; an access means arranged between a storage chamber and the buffer stage and used to replace the non-fully charged battery into the storage chamber and place the fully-charged battery to the buffer stage.

The inventive system comprises a storage chamber having a plurality of battery rooms arranged in a matrix fashion. By using the storage chamber, the fully-charged battery can be preferentially selected. The battery rooms are used to accommodate the battery unloaded from the vehicle for charging detection and management.

The inventive system further comprises a control unit connected with the storage chamber for controlling the loading and unloading of the battery of the vehicle, and connected with the buffer stage for controlling the transfer of the loaded/unloaded battery. The control unit is also connected to the access means for controlling the charging of the battery, which is unloaded from the access means and charged within the storage chamber and for placing the fully-charged battery to the buffer storage.

The access means preferably comprises a railway for placing an automatically moving stage which moves laterally on the railway; an escalator moving vertically between the top and bottom end of the chamber to select a specific room; an access stage arranged on top of the escalator and selecting a room in conjunction with the movement of the automatically moving stage and the escalator, thus accesses the battery in the room; wherein the access stage stores the unloaded battery from the buffer stage to the chamber for battery detection and charging operation, and takes the most preferential battery from the chamber to the buffer stage for placing it into the electric vehicle.

The buffer stage and access means are preferably replaced by an automatic access means arranged between a storage chamber and the transfer stage, and used to place the non-fully charged battery into the storage chamber and place the fully-charged battery to the transfer stage.

The inventive battery charging and transferring system is preferably arranged on a mobile carrier such that the battery charging and transferring system is more convenient and mobility.

The various objects and advantages of the present invention will be more readily understood from the following detailed description when read in conjunction with the appended drawing, in which:

DETAIL DESCRIPTION OF PREFERRED EMBODIMENT

The present invention is intended to use a discretionary scheme rather than conventional continuous scheme and select the fully-charged battery to load on the transfer stage, thus eliminates the difficulty caused by the charging time difference.

The inventive system comprises at least one transfer stage for clamping the electric vehicle; at least one buffer stage for temporarily storing the fully-charged or non-fully charged battery; at least one access stage for fetching the battery; at least one storage chamber for storing battery; and a control stage for managing the operation of overall system. Therefore, the inventive system can select the first fully-charged battery among those charged batteries and provide the selected battery to the electric vehicle requiring a fully-charged battery.

Figure 1:
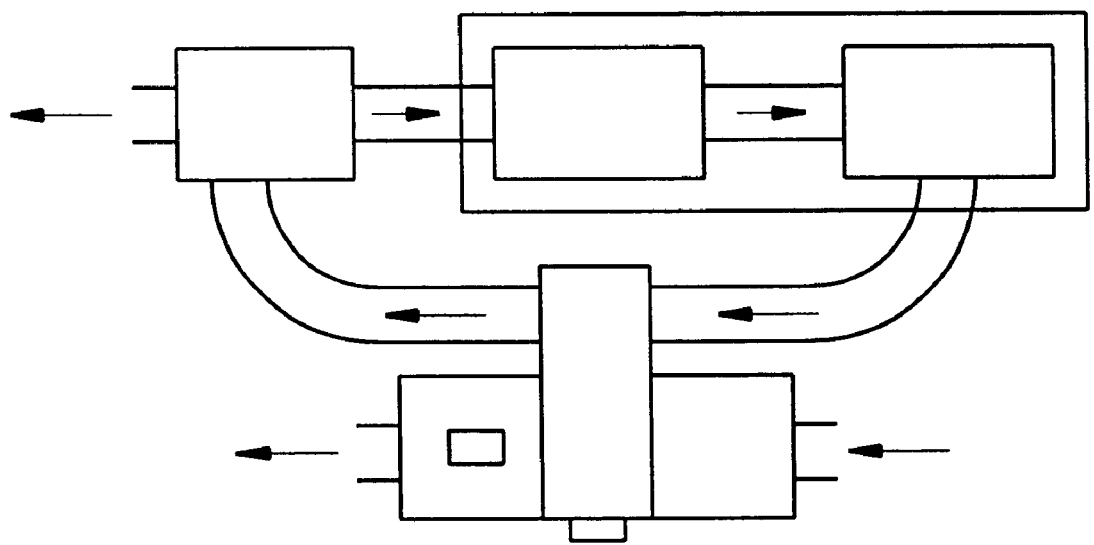
FIG. 1 shows the planar view of a conventional battery charging and transferring system.
Figure 2:
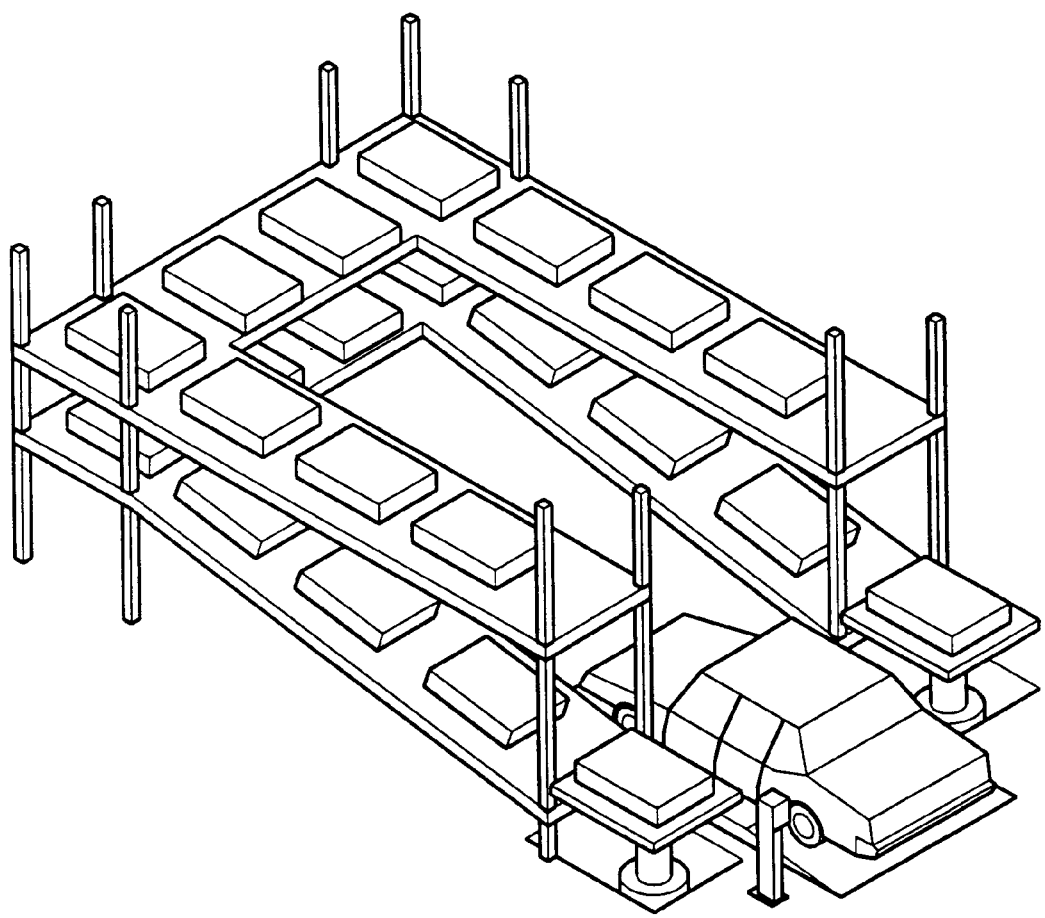
FIG. 2 shows the perspective view of another conventional battery charging and transferring system.
Figure 3:
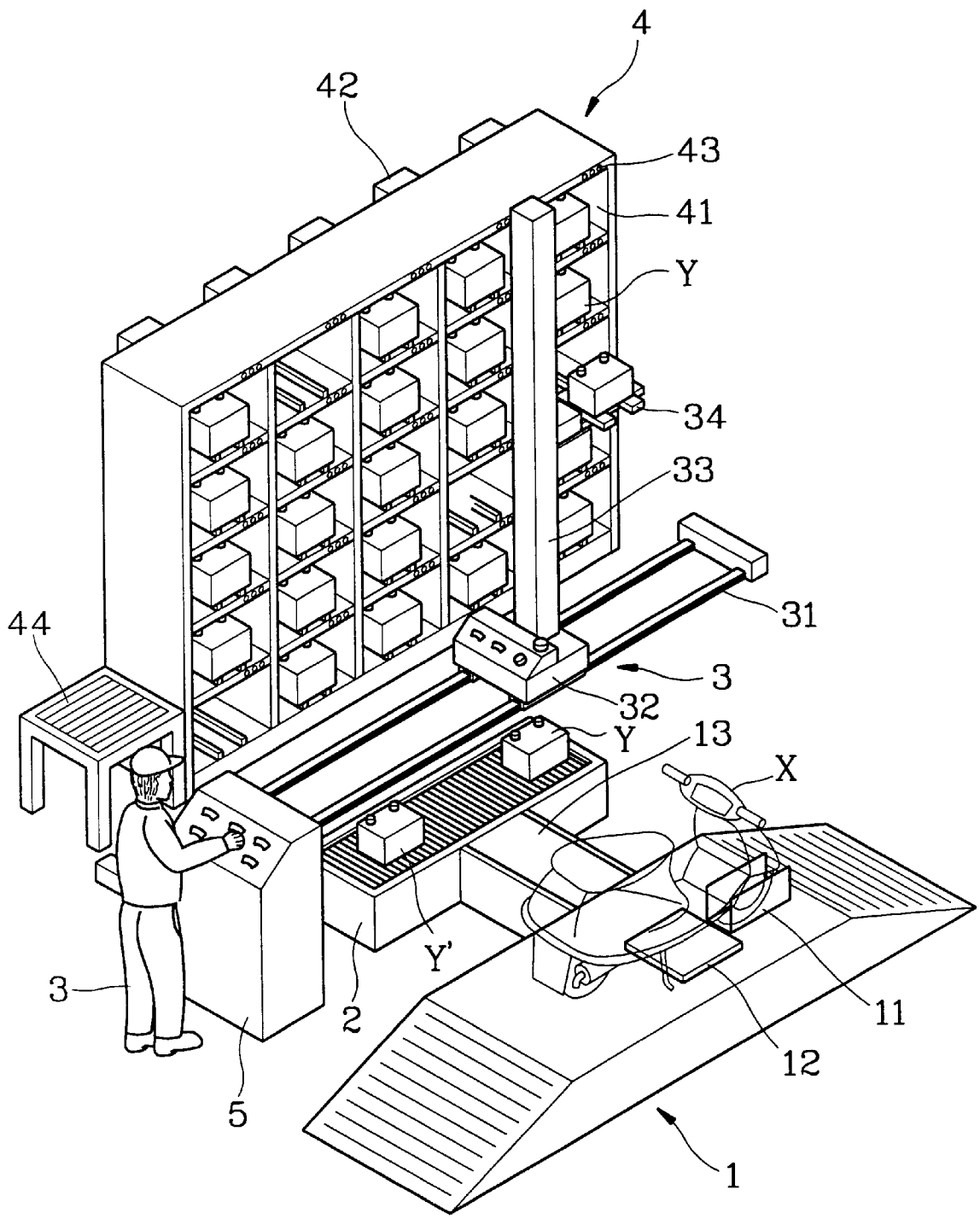
FIG. 3 shows the perspective view of the battery charging and transferring system according to the first embodiment of the invention.

With reference now to FIG. 3, the figure shows the perspective view of the first embodiment of the invention. The first embodiment comprises a transfer stage 1 for clamping the electric vehicle X requiring a fully-charged battery and replacing a fully-charged battery Y' for the vehicle X; a buffer stage 2 beside the transfer stage 1, wherein the used battery Y unloaded from the electric vehicle X is arranged in one side thereof and a fully-charged battery Y' is arranged on another side thereof; an access means 3 arranged between a storage chamber 4 and the buffer stage 2 and used to replace the non-fully charged battery Y into the storage chamber 4 and place the fully-charged battery Y' to the buffer stage 2.

The inventive system comprises a storage chamber 4 having a plurality of battery rooms 41 arranged in a matrix fashion. By using the storage chamber 4, the fully-charged battery Y' can be preferentially selected. The battery rooms 41 are used to accommodate the battery Y unloaded from the vehicle X for charging detection and management.

The inventive system further comprises a control unit 5 connected with the storage chamber 4 for controlling the loading and unloading of the battery of the vehicle, and connected with the buffer stage 2 for controlling the transfer of the loaded/unloaded battery. The control unit 5 is also connected to the access means 3 for controlling the charging of the battery Y, which is unloaded from the access means and charged within the storage chamber 4 and for placing the fully-charged battery Y' to the buffer storage.

The storage chamber in the first embodiment further comprises one or more battery sensor 42 placed within the room 41 and for detecting the ID code of the battery and managing the charging operation. The sensor 42 is designed to be movable along the stage of the chamber 4 such that one sensor can be shared by multiple rooms. The chamber 4 further comprises a plurality of indicating lamps 43 each arranged within one room 41 to indicate that the room 41 has the charging battery, the most fully-charged battery or the most preferential battery. Moreover, the chamber 4 includes a rejection region 44 for housing the rejected battery.

The access stage 3 in the first embodiment comprises a railway 31 for placing an automatic stage 32 which moves laterally on the railway 31 from one side to another side of the chamber to choose a specific room 41. The railway 31 is further provided with an escalator 33 moving vertically between the top and bottom end of the chamber 4 to select a specific room 41.

An access stage 34 is arranged on top of the escalator 33 and selects a room 41 in conjunction with the movement of the automatic stage 32 and the escalator 33, thus fetch the battery Y in the room 41. The access stage 34 stores the unloaded battery Y from the buffer stage 2 to the chamber 4 for battery detection and charging operation, and takes the most preferential battery Y' from the chamber 4 to the buffer stage 2 for placing it into the electric vehicle X.

Figure 4:
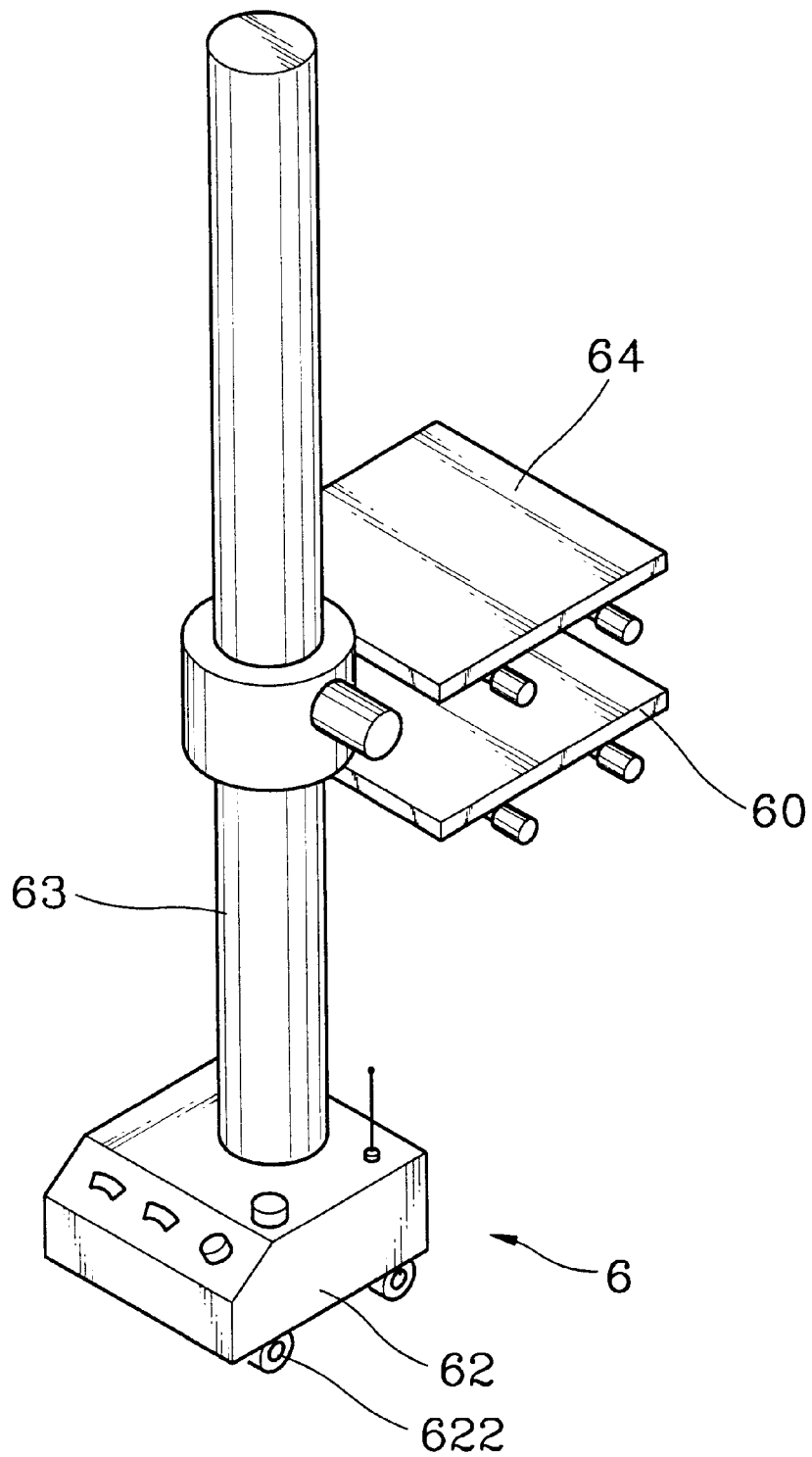
FIG. 4 shows the perspective view of the battery charging and transferring system with automatic access means according to the second embodiment of the invention.

As to the second embodiment of the invention, an automatic access means 6 with buffer stage (as shown in FIG. 4) replaces the buffer stage 2 and the access means 3, i.e., integrates the function of the buffer stage 2 and the access means 3 such that the automatic access means 6 can temporarily store both fully and non-fully charged battery without the risk of taking wrong battery.

FIG. 4 shows the second embodiment of the invention, wherein the automatic access means 6 with buffer function is provided. The automatic access means 6 comprises an auto-move stage 62 having moving means such as pulley 622 to move freely between the transfer stage 1 and the storage chamber 4 in order to transfer battery and select a battery room 41, an escalator 63 on the auto-move stage 62 to move vertically between top and bottom end of the storage chamber 4 to select a battery room 41, a store stage 60 beside the escalator 63 to store the battery Y unloaded from the transfer stage 1 and move freely with the auto-move stage 62, and place the battery Y into the storage chamber 4 for battery detection and charge.

Similarly, an unloading stage 64 is placed on the store stage 60 and arranged beside the escalator 63, the unloading stage 64, in conjunction with the planar and vertical movement of the auto-move stage 62 selects the most preferential room 41 of the storage chamber 4 and take the battery Y' from the room 41, and transfer the battery Y' to be loaded on vehicle X to the transfer stage 1.

Figure 5:
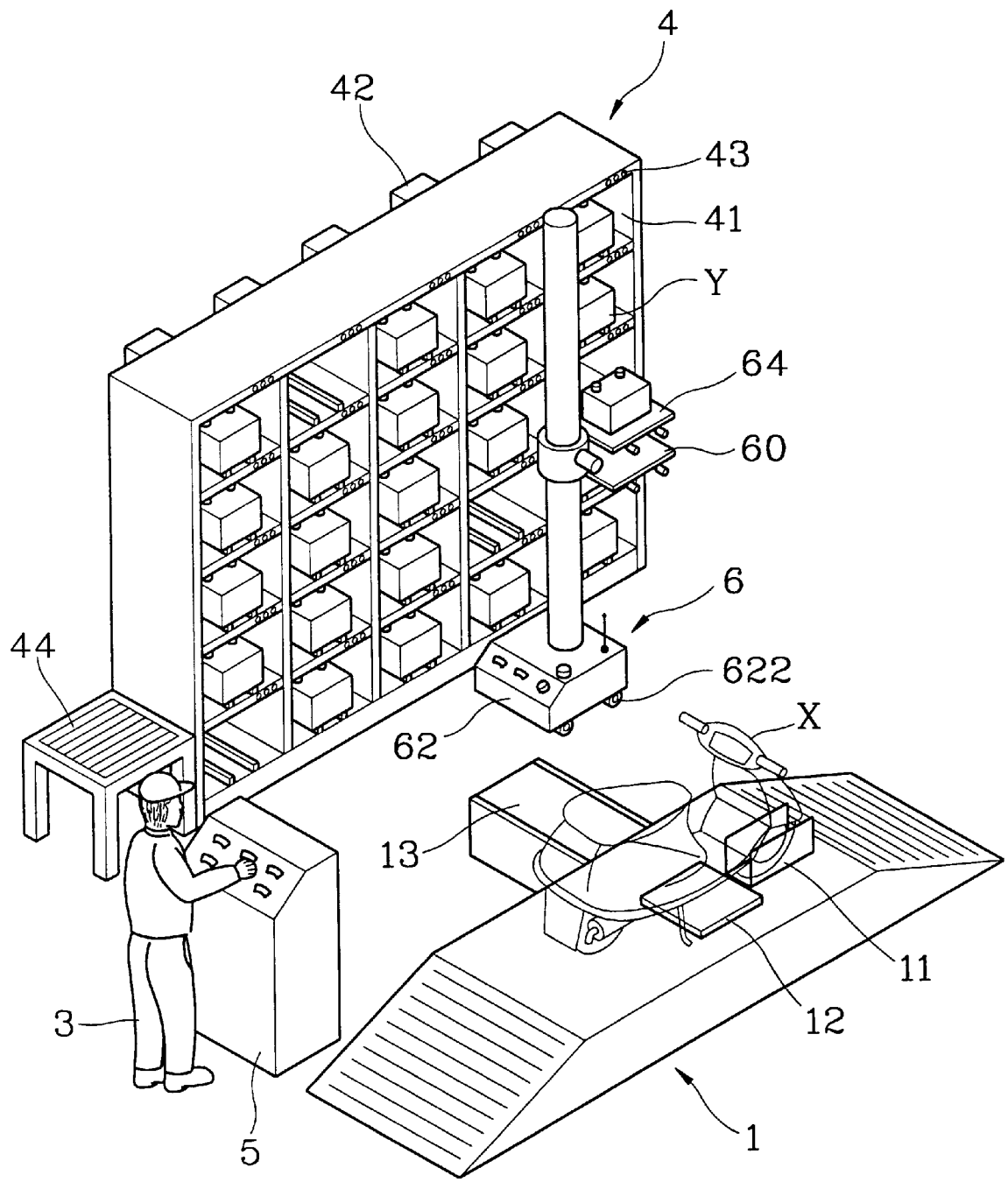
FIG. 5 shows the application of the battery charging and transferring system with automatic access means according to the second embodiment of the invention.

FIG. 5 shows the perspective view of the second embodiment of the invention, wherein the automatic access means 6 replaces the buffer stage 2 and the access means 3 of the first embodiment, and moves freely between the transfer stage 1 and the storage chamber 4 for temporarily storing fully and non-fully charged battery without interfering the transfer process of the battery Y.

Figure 6:
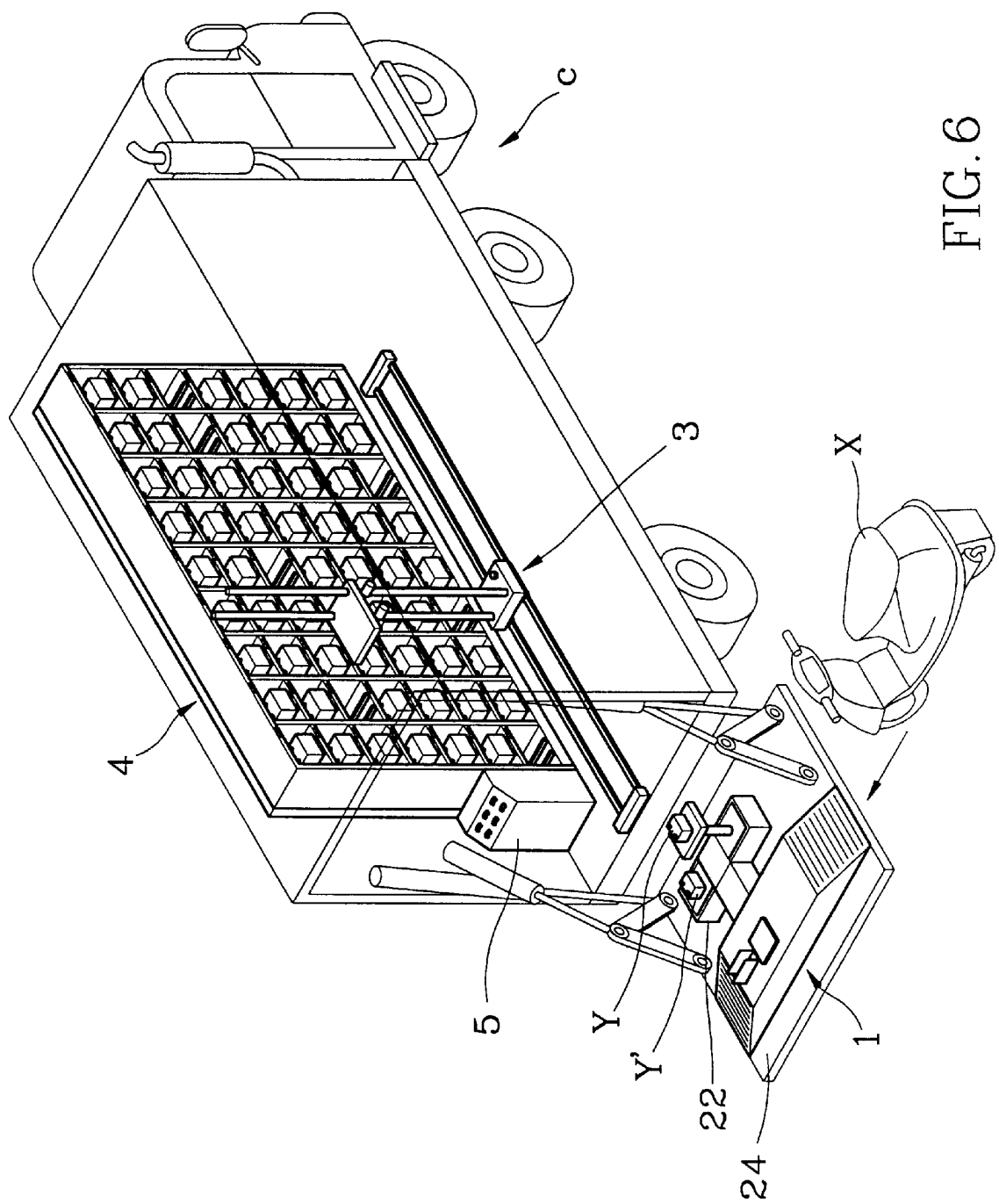
FIG. 6 shows the perspective view of the battery charging and transferring system according to the third embodiment of the invention.

FIG. 6 shows the perspective view of the third embodiment of the invention, wherein the transfer stage 1 in the first embodiment is arranged on a mobile carrier c to give the overall system mobility.

As shown in FIG. 6, as in the first embodiment, the third embodiment comprises a transfer stage 1 for clamping the electric vehicle X requiring a fully-charged battery and replacing a fully-charged battery Y' for the vehicle X; a buffer stage 22 beside the transfer stage 1, wherein the used (non-fully charged) battery Y unloaded from the electric vehicle X is arranged in one side thereof and a fully-charged battery Y' is arranged on another side thereof; an access means 3 arranged between a storage chamber 4 and the buffer stage 22 and used to replace the non-fully charged battery Y into the storage chamber 4 and place the fully-charged battery Y' to the buffer stage 22.

The inventive system comprises a storage chamber 4 having a plurality of battery rooms 41 arranged in a matrix fashion. By using the storage chamber 4, the fully-charged battery Y' can be preferentially selected. The battery rooms 41 are used to accommodate the battery Y unloaded from the vehicle X for charging detection and management. The inventive system further comprises a control unit 5 connected with the storage chamber 4 for controlling the loading and unloading of the battery of the vehicle, and connected with the buffer stage 22 for controlling the transfer of the loaded/unloaded battery. The control unit 5 is also connected to the access means 3 for controlling the charging of the non-fully charged battery Y, which is unloaded from the access means and charged within the storage chamber 4 and for placing the fully-charged battery Y' to the buffer storage 22.

In the third embodiment, the transfer stage 1, the access means 3, the storage chamber 4 and the control unit 5 are the same as those of the first embodiment, but the buffer stage 22 is different to the buffer stage 2 of the first embodiment. The buffer stage 2 of the first embodiment and the buffer stage 22 of the third embodiment are on one side door of the carrier c, for the buffer stage 22 can move vertically. In the third embodiment, the side door is a back door 24. When the battery of the vehicle is needed to replace, the back door 24 of the carrier c requires opening such the back door 24 is placed on ground and the vehicle X is moved to the transfer stage 1. Therefore, the buffer storage 22 requires the elevation function.

Moreover, the fourth embodiment employs the automatic access means 6 of the second embodiment and the carrier c of the third embodiment. It should be noted that the fourth embodiment still has the buffer stage 22 because the automatic access means 6 of the fourth embodiment replaces only the access means 3. The buffer stage 22 is required for the elevation of the battery to be replaced.

Figure 7:
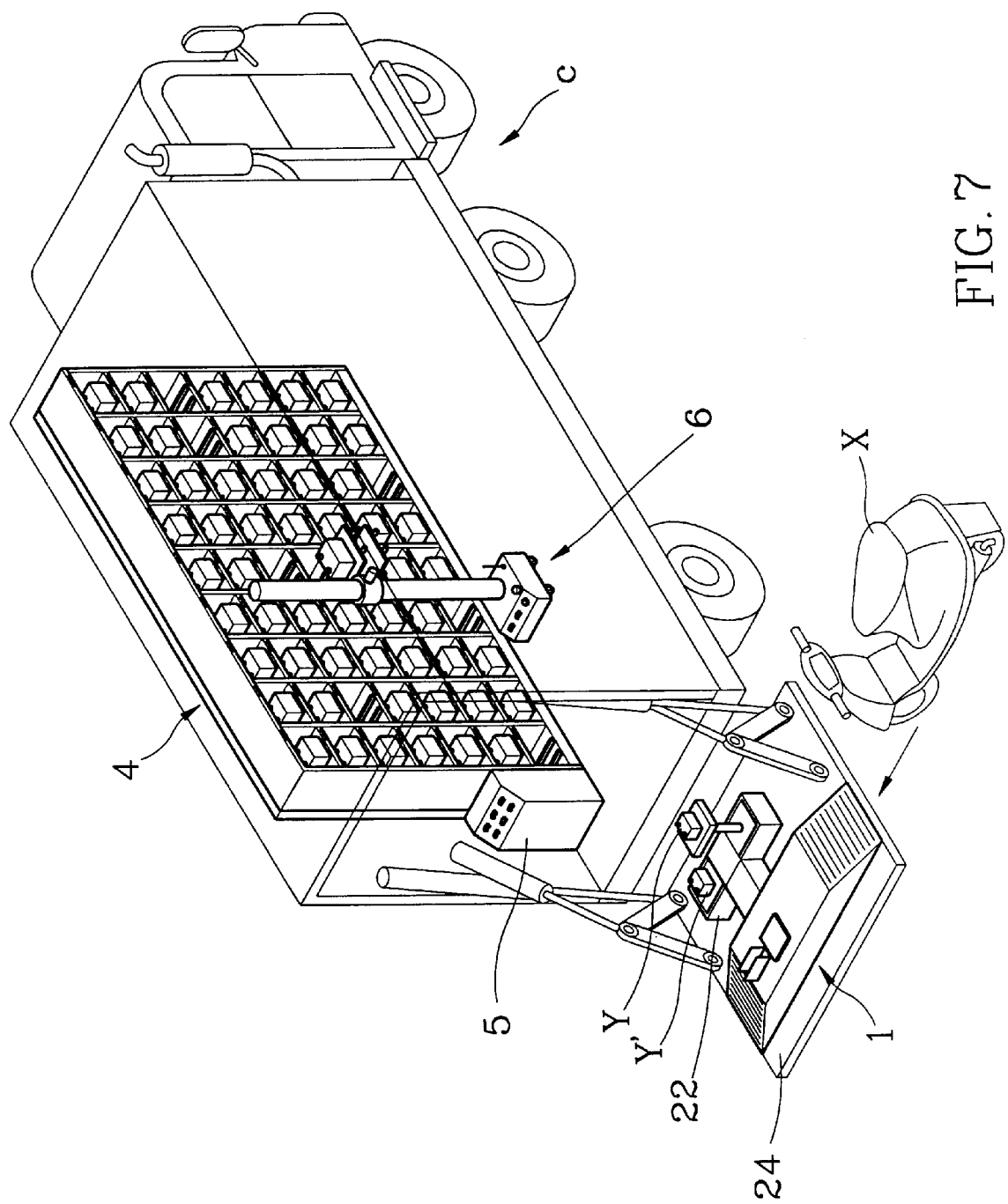
FIG. 7 shows the perspective view of the battery charging and transferring system according to the fourth embodiment of the invention.

FIG. 7 shows the perspective view of the fourth embodiment of the invention. The fourth embodiment comprises a transfer stage 1 for clamping the electric vehicle requiring a fully-charged battery and replacing a fully-charged battery Y' for the vehicle X; a buffer stage 22 beside the transfer stage 1, wherein the used battery Y unloaded from the electric vehicle X is arranged in one side thereof and a fully-charged battery Y', is arranged on another side thereof; an automatic access means 6 arranged between a storage chamber 4 and the buffer stage 22 and used to replace the non-fully charged battery Y into the storage chamber 4 and place the fully-charged battery Y' to the buffer stage 22. The inventive system comprises a storage chamber 4 having a plurality of battery rooms 41 arranged in a matrix fashion. By using the storage chamber 4, the fully-charged battery Y' can be preferentially selected. The battery rooms 41 are used to accommodate the battery Y unloaded from the vehicle X for charging detection and management.

The inventive system further comprises a control unit 5 connected with the transfer stage 1 for controlling the loading and unloading of the battery of the vehicle, and connected with the automatic access means 6 for controlling the transfer of the loaded/unloaded battery.

Figure 8:
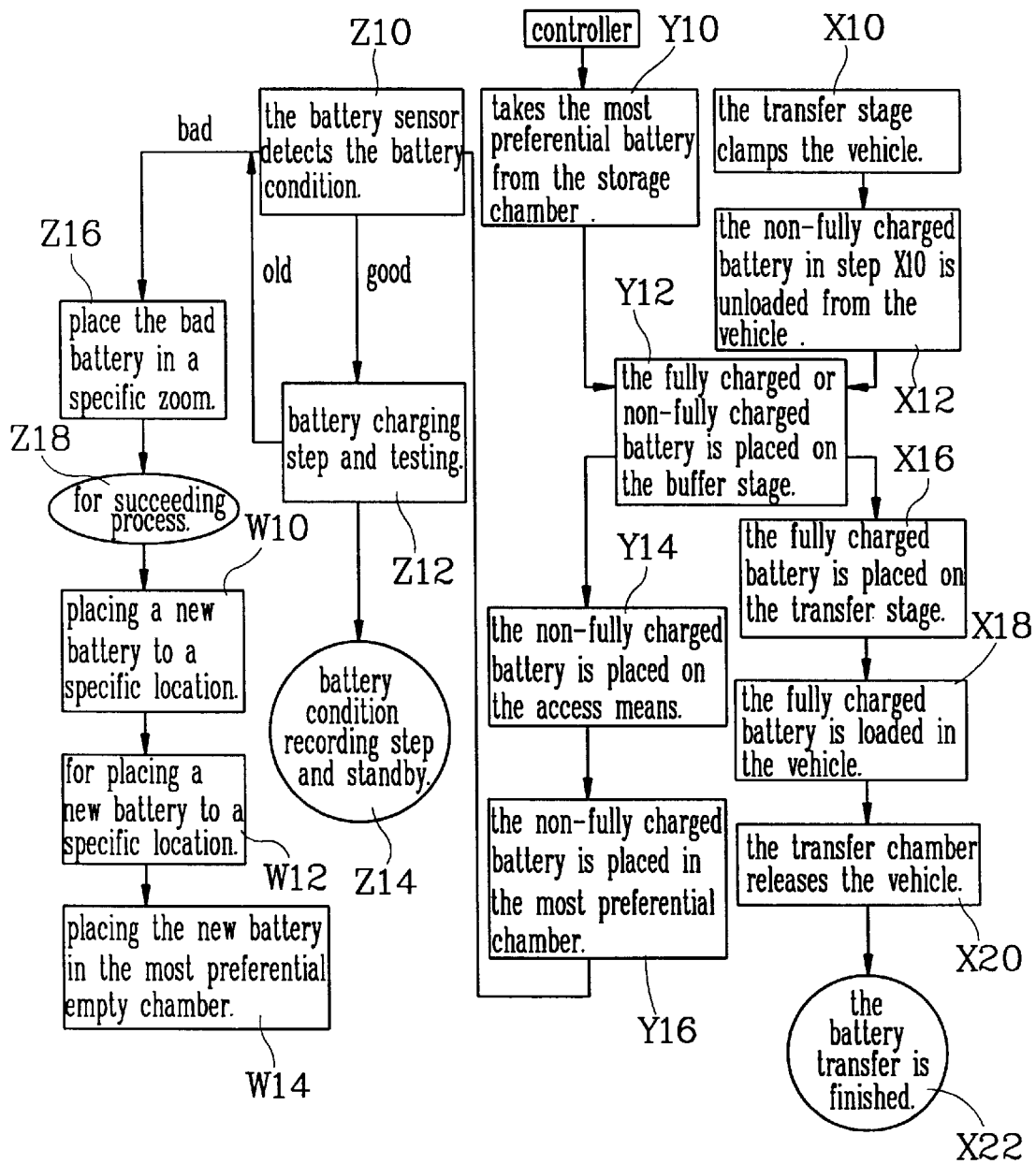
FIG. 8 is the flowchart for the control unit according to the first embodiment of the invention.

FIG. 8 shows the operational flowchart of the first embodiment. As shown in this figure, the control unit 5 can simultaneously process below four procedures (X, Y, Z, W) X10: the transfer stage 1 clamps the vehicle, Y10: the access means 3 takes the most preferential battery from the storage chamber 4, Z10: the battery sensor 42 detects the battery condition, W10: placing a fully-charged battery to a specific location. Moreover, in step X12, the non-fully charged battery in step X10 is unloaded from the vehicle, in step Y12, the fully or non-fully charged battery is placed on the buffer stage, in step X16, the fully-charged battery is placed on the transfer stage, in step X18, the fully-charged battery is loaded in the vehicle, in step X20, the transfer chamber releases the vehicle, in step X22, the battery transfer is finished.

As to the Y procedure, after step Y12 wherein the fully or non-fully charged battery is placed on the buffer stage, in step Y14, the non-fully charged battery is placed on the access means, in step Y16, the non-fully charged battery is placed in the most preferential chamber, then proceeds to procedure Z.

In procedure Z, after step Z10 wherein the battery sensor 42 detects the battery condition, if the battery is good then go to the battery charging step and testing Z12, and then go to the battery condition recording step and standby Z 14; if the battery is not good (means it's bad or old), then go to the step Z16 to place the bad or old battery in a specific zoom, and in step Z18 for succeeding process. Then the procedure W is performed.

After the step W10 for placing a new battery to a specific location, in step W12 the new battery is placed in the access means, in step W14, placing the new battery in the most preferential empty chamber, then followed by step Z14 (battery condition recording step), thus completes the process.

FIG. 3 shows the view for explaining operation of the invention, the electric vehicle X is arranged on stage 1 which can clamp the electric vehicle X. The clamping means shown in FIG. 3 is applicable for motorcycle.

Afterward, the battery replacing means 12 is lifted and unloads the non-fully charged battery, which is sent to the buffer stage 2 by the transfer belt 13. The access means 3 takes a most preferential battery from the storage chamber 4 and places it on the access stage 34 of the lifter 33, wherein a moving stage 32 is below the access means 3 and runs on the rail 31. The access means 3 can be of various types including fork lift, automatic fork lift with or without rail, or robot.

Afterward, the fully-charged battery is sent to the buffer stage 2 and the access means 3 moves the non-fully charged battery to the most preferential room 41 of the chamber 4, and locates the non-fully charged battery. At the same time, the fully-charged battery on the buffer stage 2 is sent, through the transfer belt, to the battery replacing means 12 on the transfer stage 1 and located. Then the battery replacing means 12 lifts the battery to a proper position on the vehicle and load the battery to the vehicle, wherein the polarity of the battery is automatically matched with that of the vehicle. After the battery is loaded, the battery replacing means 12 is lowered down and the clamping means 11 is loosen to release the vehicle.

The buffer stage 2 shown in FIG. 3 is preferably arranged beside the transfer stage 1 to temporarily store the non-fully charged battery. In some cases, the access means 3 is suitable for more than two access stages 60, 64, as shown in FIG. 4, half amount of access stage 60 can be used as buffer stage 2, thus saves independent buffer stage.

The storage chamber 4 shown in FIG. 3 can more economically have battery sensing and charging function beside storage function. The non-fully charged battery is marked by the battery sensor 42 in a mark means after being placed into the chamber 4, wherein the mark means can adopt bar code or memory IC. The versatile memory IC is more preferable.

Moreover, the battery sensor 42 also detects other battery conditions such as the inner resistance and the liquid level of the lead battery. For example, the low level of the lead liquid indicates possibility of leakage, and abnormal inner resistance indicates that electrodes may be eroded. Those batteries sensed by the battery sensor 42 as defective are marked and removed by the access means 3 to place in the defective region 44.

The battery sensor 42 can be operated automatically or manually. The normal batteries are charged while the polarity thereof is matched with the polarity of the room 41 by an automatic coupling means. However, the specification of the battery is diverse, the description of the automatic coupling means is omitted here.

The charging problems include low charging current, the leakage of the electrode bath, those problems are regularly examined by the battery sensor 42 and the defective battery is marked. When the battery is fully charged, the battery sensor 42 will mark information such as charging time, date, newest voltage and resistance in the mark means. The fully-charged battery is ranked by the control unit and the indicating lamp 3 display the condition of the battery room 41 such as charging, most preferentially ready or empty.

After the defective battery is taken away, the new supplied battery is placed in a specific region such as buffer stage 2 defective region 44 or the access stage 34. The battery is placed in the most preferential room 41 or processed by the sensor 42 if the battery is an all new one.

Some operations of the inventive system can be performed manually such as the sensing and fetching operation, or all operations are performed automatically by a CPU-based controller, as shown in FIG. 8.

To sum up, the amounts of battery is reduced due to the discretionary feature of the present invention, the occupied space of the invention is less because the continuous convey belt is saved. The inventive system can be arranged in a small space as shown in FIG. 6. Fir example, the inventive system can be arranged in a trailer or other carriers, this is more economical and motive.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A selective-type battery charging and transferring system for electric vehicle which comprising:

a transfer stage for clamping said electric vehicle and replacing a fully charged battery for the vehicle;

a buffer stage beside the transfer stage, the used battery unloaded from the electric vehicle X is arranged on one side thereof and a fully-charged battery is arranged on another side thereof;

an access means arranged between a storage chamber and the buffer stage, and used to place the non-fully charged battery into the storage chamber and place the fully-charged battery to the buffer stage from any battery room;

a storage chamber having a plurality of battery rooms and used to accommodate the battery unloaded from the vehicle for charging detection and management;

a control unit connected with the transfer stage for controlling the loading and unloading of the battery of the vehicle, and connected with the buffer stage for controlling the transfer of the loaded/unloaded battery, and also connected to the access means for controlling the charging of the battery, which is unloaded from the access means and charged within the storage chamber and for placing the fully-charged battery to the buffer storage.

2. The selective-type battery charging and transferring system as in claim 1, wherein said battery rooms are arranged in a matrix fashion.

3. The selective-type battery charging and transferring system as in claim 1, further comprises one or more battery sensor placed within the room and for detecting the condition of the battery and managing the charging operation.

4. The selective-type battery charging and transferring system as in claim 1, further comprises indicating lamp in each said room to display the condition of the battery room such as charging, most preferentially ready or empty.

5. The selective-type battery charging and transferring system as in claim 1, further comprises a defective region in said storage chamber to place the defective battery.

6. The selective-type battery charging and transferring system as in claim 1, wherein said access means comprises:

a railway for placing an automatically moving stage which moves laterally on the railway;

an escalator moving vertically between the top and bottom end of the chamber to select a specific room;

an access stage arranged on top of the escalator and selecting a room in conjunction with the movement of the automatically moving stage and the escalator, thus fetch the battery Y in the room;

wherein the access stage stores the unloaded battery from the buffer stage to the chamber for battery detection and charging operation, and takes the most preferential battery from the chamber to the buffer stage for placing it into the electric vehicle.

7. A selective-type battery charging and transferring system for electric vehicle which comprising:

a transfer stage for clamping said electric vehicle and replacing a fully charged battery for the vehicle;

an automatic access means arranged between a storage chamber and the transfer stage, and used to place the non-fully charged battery into the storage chamber and place the fully-charged battery to the transfer stage from any battery room;

a storage chamber having a plurality of battery rooms and used to accommodate the battery unloaded from the vehicle for charging detection and management;

a control unit connected with the transfer stage for controlling the loading and unloading of the battery of the vehicle, and connected to the automatic access means for controlling the charging of the battery, which is unloaded from the access means and charged within the storage chamber and for placing the fully-charged battery to the buffer storage.

8. The selective-type battery charging and transferring system as in claim 7, wherein said battery rooms are arranged in a matrix fashion and having means in each said room to display the condition of the battery room such as charging, most preferentially ready or empty.

9. The selective-type battery charging and transferring system as in claim 7, further comprises one or more battery sensor placed within the room and for detecting the condition of the battery and managing the charging operation.

10. The selective-type battery charging and transferring system as in claim 7, further comprises indicating lamp in each said room to display the condition of the battery room such as charging, most preferentially ready or empty.

11. The selective-type battery charging and transferring system as in claim 7, further comprises a defective region in said storage chamber to place the defective battery.

12. The selective-type battery charging and transferring system as in claim 7, wherein said access means comprises:
- an automatic moving stage moving laterally freely between the transfer stage and the storage chamber;
- an escalator arranged on the automatic moving stage and moving vertically between the top and bottom end of the chamber to select a specific room;
- a store stage arranged on one side of the escalator and moved with the automatic moving stage laterally and used to receive the battery unloaded from the vehicle of the transfer stage and place the battery into the chamber for battery detection and charging;
- a access stage arranged on one side of the escalator and moved with the automatic moving stage laterally and used to choose the most preferential room of the chamber and take the battery from the battery room and transfer the battery to the transfer stage for loading on the vehicle.

13. The selective-type battery charging and transferring system as in claim 7, further comprises a mobile carrier wherein the transfer stage is arranged on one side thereof and the automatic access means and the storage chamber are arranged therein such that the selective-type battery charging and transferring system has mobility.

14. The selective-type battery charging and transferring system as in claim 1, further comprises a mobile carrier wherein the transfer stage is arranged on one side thereof and the automatic access means and the storage chamber are arranged therein such that the selective-type battery charging and transferring system has mobility.

* * * * *